United States Patent
Maruta et al.

(10) Patent No.: US 6,205,166 B1
(45) Date of Patent: Mar. 20, 2001

(54) CDMA RECEIVER WITH ANTENNA ARRAY ADAPTIVELY CONTROLLED WITH COMBINED ERRORS OF DESPREAD MULTIPATH COMPONENTS

(75) Inventors: Yasushi Maruta; Shousei Yoshida; Akihisa Ushirokawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/129,541

(22) Filed: Aug. 5, 1998

(30) Foreign Application Priority Data

Aug. 5, 1997 (JP) .................................................. 9-210336

(51) Int. Cl.⁷ ........................... H04K 1/00; H04B 15/00; H04B 7/216
(52) U.S. Cl. ........................ 375/130; 375/147; 375/345; 370/342
(58) Field of Search ................................. 375/130, 140, 375/142, 144, 147, 148, 150, 367; 370/320, 335, 342, 441; 455/65, 137, 272, 273

(56) References Cited

U.S. PATENT DOCUMENTS

| 5,289,499 | 2/1994 | Weerackody | 375/141 |
| 5,414,699 | 5/1995 | Lee | 375/150 |
| 6,069,912 | * 5/2000 | Sawahashi et al. | 375/142 |

FOREIGN PATENT DOCUMENTS

| 0 667 686 A2 | 8/1995 | (EP) . |
| 0 773 638 A1 | 5/1997 | (EP) . |
| 7-74685 | 3/1995 | (JP) . |
| 8-274687 | 10/1996 | (JP) . |
| 9-74372 | 3/1997 | (JP) . |

OTHER PUBLICATIONS

Tanaka, S. Et al.: "Pilot Symbol–Assisted Decision–Directed Coherent Adaptive Array Diversity for DS–CDMA mobile Radio Reverse Link" IEICE Transactions on Fundamentals Electronics, Communications and Computer Sciences, JP, Institute of Electronics Information and Comm. Eng., Tokyo, vol. E80–A, No. 12, Dec. 1, 1997, pp. 2445–2453, XP000768670.

* cited by examiner

Primary Examiner—Stephen Chin
Assistant Examiner—Betsy L. Deppe
(74) Attorney, Agent, or Firm—Sughrue, Mion, Zinn, Macpeak & Seas, PLLC

(57) ABSTRACT

In a CDMA receiver, signals from a number of correlatively spaced apart antennas are respectively multiplied by weight coefficients and summed together to produce a weighted sum signal, which is separated into multipath components of a transmitted signal. The multipath components are despread with a chip sequence, producing despread signals at symbol intervals. Demodulators estimate channel responses of propagation paths from the despread signals and multiply the despread signals by the estimated channel responses to produce demodulated signals, which are summed and a threshold decision is made on the sum of the demodulated signals to produce a decision output. Error detection circuitry multiplies the decision output by the estimated channel responses to produce a number of multiplied decision outputs, and detects differences between the multiplied decision outputs and the despread signals to produce a number of error signals, which are combined together. Weight control circuitry is responsive to the combined error signals for updating the weight coefficients.

15 Claims, 3 Drawing Sheets

CDMA RECEIVER WITH ANTENNA ARRAY ADAPTIVELY CONTROLLED WITH COMBINED ERRORS OF DESPREAD MULTIPATH COMPONENTS

BACKGROUND OF THE INVENTION

1. Field of the Invention

The present invention relates generally to spread spectrum communication systems and more specifically to a code division multiple access (CDMA) communication receiver having an array of antennas whose directivity pattern is adaptively controlled.

2. Description of the Related Art

For CDMA communication receivers, it is known to use an adaptive array of antennas for receiving user signals. Each of the received user signals is separated into multipath components, which are supplied respectively to adaptive processing units so that each unit receives a set of multipath components of same arrival time. In each processing unit, the input signals are respectively multiplied with weight coefficients and summed together to produce a weighted sum signal. This signal is despread with a chip sequence and demodulated. The demodulated signals from the processing units are combined in an adder and a threshold decision is performed on the output of the adder to produce a symbol output. Each processing unit detects a decision error of the symbol output and produces the weight coefficient by detecting correlations between the set of multipath components and the decision error.

However, since the adaptive processing units are provided in number corresponding to the number of multipath components, and each unit performs weighting and summing operations and updating the weight coefficients, implementation of the prior art system suffers from hardware complexity. Additionally, difficulty is encountered for the prior art antenna array to create a distinct directivity pattern when the signals received by the antennas contain numerous multipath components, particularly when they contain weak components, due to decreased reliability of the decision errors.

SUMMARY OF THE INVENTION

It is therefore an object of the present invention to provide a code division multiple access communication receiver having an adaptive array of antennas which can be implemented with reduced hardware and which is capable of adaptively controlling the antenna pattern even when the received signal contains numerous multipath components.

According to a first aspect of the present invention, there is provided a code division multiple access communication receiver comprising a plurality of antennas spaced a correlation distance apart from each other, and multiply-and-add circuitry for respectively weighting signals from the antennas with weight coefficients and summing the weighted signals to produce a weighted sum signal. Separation circuitry separates the weighted sum signal into multipath components which respectively correspond to propagation paths of a signal transmitted from a user station. A plurality of despreaders are provided for respectively despreading the separated multipath components with a chip sequence assigned to the user station to produce a plurality of despread signals at symbol intervals. Error detection circuitry detects a plurality of errors between a symbol output and the despread signals and combines the errors to produce a combined error signal. Weight control circuitry produces the weight coefficients from the signals detected by the antennas and updates the weight coefficients according to the combined error signal.

Preferably, the receiver includes a plurality of demodulators for estimating channel responses of the propagation paths from the despread signals and multiplying the despread signals by the estimated channel responses to produce a plurality of demodulated signals. The demodulated signals are summed and threshold decision is made on the sum of the demodulated signals to produce a decision output. The error detection circuitry is arranged to multiply the decision output by the estimated channel responses to produce a plurality of multiplied decision outputs, and detect a plurality of differences between the multiplied decision outputs and the despread signals to produce the errors.

According to a second aspect, the present invention provides a code division multiple access communication receiver comprising a plurality of antennas spaced a correlation distance apart from each other, and a plurality of despreaders for respectively despreading signals detected by the antennas with a chip sequence assigned to a user station to produce a plurality of despread signals at chip intervals. Multiply-and-add circuitry is connected to the despreaders for respectively weighting the despread signals by weight coefficients, separating each of the weighted despread signals into a plurality of multipath components which respectively correspond to propagation paths of a signal transmitted from the user station and summing the seperated multipath components to produce a plurality of weighted sum signals each representative of the sum of the multipath components of same arrival time. Error detection circuitry detects a plurality of errors between a symbol output and the weighted sum signals, and combining the errors to produce a combined error signal, and weight control circuitry produces the weight coefficients from the despread signals and updates the weight coefficients according to the combined error signal.

Preferably, a plurality of demodulators are provided for estimating channel responses of the propagation paths from the weighted sum signals and respectively multiplying the weighted sum signals by the estimated channel responses to produce a plurality of demodulated signals. The demodulated signals are summed and a threshold decision is made on the sum of the demodulated signals to produce a decision output. The error detection circuitry is arranged to multiply the decision output by the estimated channel responses to produce a plurality of multiplied decision outputs, and detect a plurality of differences between the multiplied decision outputs and the despread signals to produce the errors.

BRIEF DESCRIPTION OF THE DRAWINGS

The present invention will be described in further detail with reference to the accompanying drawings, in which.

DETAILED DESCRIPTION

Figure 1:
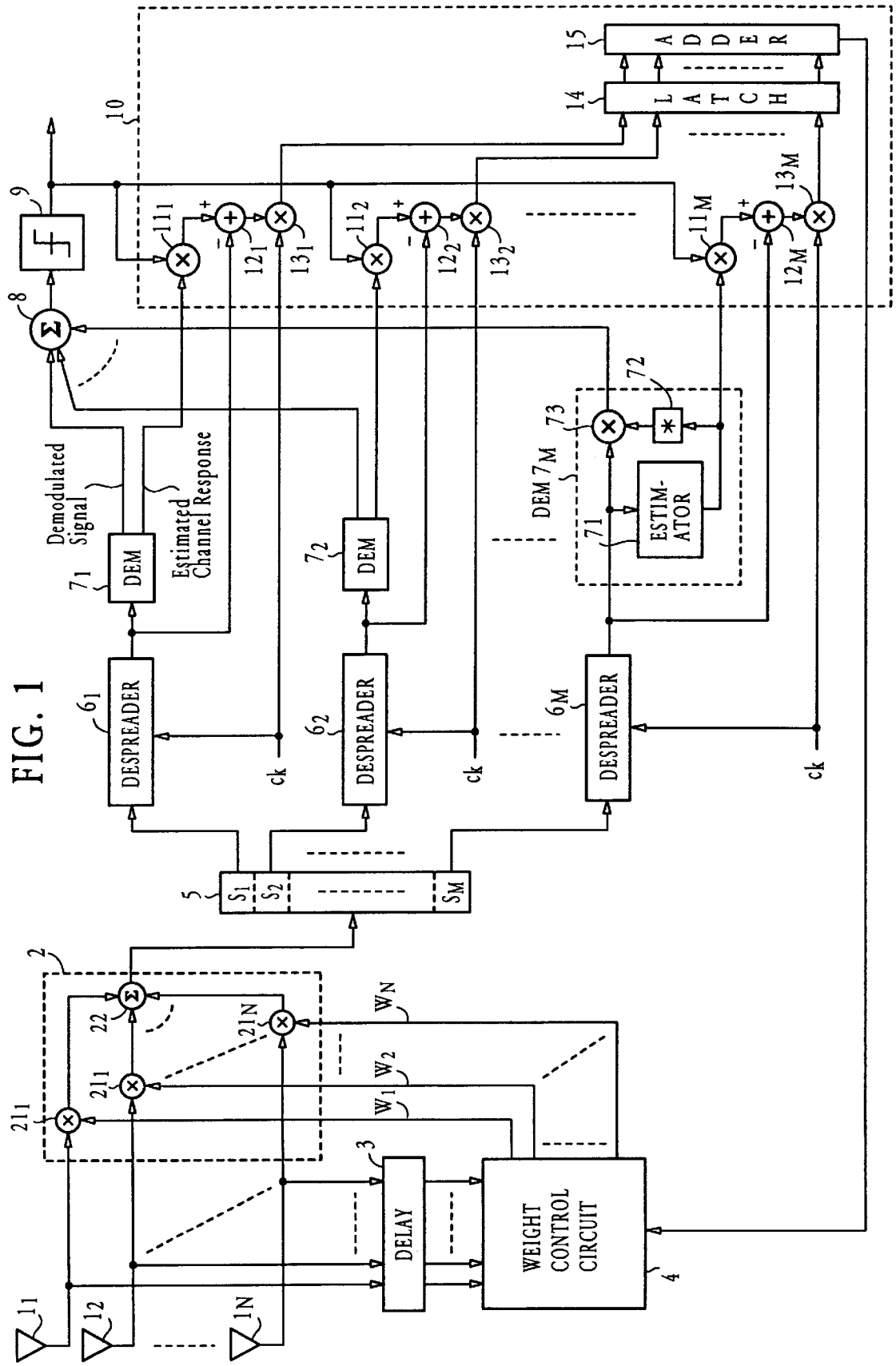
FIG. 1 is a block diagram of an adaptive array CDMA receiver according to a first embodiment of the present invention.

Referring now to FIG. 1, there is shown an adaptive array CDMA receiver of a cell-site station for receiving spread spectrum signals from a particular user. The CDMA receiver includes an array of antennas $1_1$ to $1_N$ spaced such a distance apart that their output signals are correlated with each other. Such a distance is called "correlation distance". Although not shown in FIG. 1, the outputs of the antennas are converted from radio frequency to an intermediate or baseband frequency. The signals from antennas $1_1$ through $1_N$ are supplied to a multiply-and-add circuit 2 where they are respectively multiplied in complex multipliers $21_1$ to $21_N$ by weight coefficients $W_1$–$W_N$ supplied from a weight control circuit 4 and summed by an adder 22. As a result, the weighted sum signal appears as if it were received by an antenna having a directivity pattern uniquely determined for a signal which has been transmitted from that particular user and propagated over different multipath fading channels, and successively arrived at the antennas as multipath components of the transmitted signal.

To detect individual multipath components contained in the weighted sum signal, the output of the adder 22 is supplied to a separation circuit 5 where the multipath components $S_1$ to $S_M$ are separated from each other and distributed to despreaders $6_1$ to $6_M$. A chip sequence $c_k$, which is uniquely assigned to that particular user "k", is supplied to the despreaders $6_1$ to $6_M$ for despreading the multipath component signals to produce convolutionally integrated output signals at symbol intervals.

The outputs of the despreaders $6_1$ to $6_M$ are respectively coupled to demodulators $7_1$ to $7_M$ of identical construction. Each demodulator comprises a channel response estimator 71 for estimating the phase and amplitude of the carrier of the corresponding multipath component as a channel impulse response by using a periodically transmitted known training sequence. The estimated channel response is an indication of the fading characteristic of the propagation path of the multipath component. A complex conjugate circuit 72 is provided for producing a complex conjugate of the estimated channel response, which is used by a complex multiplier 73 to multiply the output signal of the corresponding despreader, so that the output of the multiplier 73 is synchronized to the phase of the transmitted carrier. The output of the multiplier 73 of each demodulator $7_m$ (where i=1, 2, . . . , M) represents the demodulated signal of an m-th multipath fading channel and the output of the channel response estimator 71 represents the impulse response of the m-th multipath fading channel.

The demodulated signals of the "m" fading channels are maximum-ratio combined in an adder 8 and a threshold decision circuit 9 makes a hard-decision on the sum signal to produce a decision output as a replica of the symbol transmitted from the particular user.

An error detection circuit 10 is provided, which includes a plurality of multipliers $11_1$ to $11_M$ where the decision symbol is multiplied by the channel responses respectively estimated by the demodulators $7_1$ to $7_M$. For the respective multipath fading channels, subtractors $12_1$ to $12_M$ are connected to the multipliers $11_1$ to $11_M$ and the despreaders $6_1$ to $6_M$ to calculate errors between the outputs of the corresponding multipliers 11 and the outputs of the corresponding despreaders 6, each representing the decision error of the m-th fading channel. These decision errors are respectively multiplied (spread) in complex multipliers $13_1$ to $13_M$ with the user's chip sequence, so that the decision errors have the same length as the chip sequence. The outputs of multipliers $13_1$ to $13_M$ are stored in respective locations of a latch 14 as they occur and retrieved simultaneously when all the locations are filled with necessary data, so that the outputs of all multipliers 13 are time-coincident with each other at the outputs of the latch 14. The outputs of the latch 14 are summed in an adder 15 to produce an output representing a combined decision error of the decision circuit 9.

The decision error from the adder 15 is applied to the weight control circuit 4 where it is used to update the weight coefficients $W_1$ to $W_N$ at chip intervals according to the MMSE (minimum mean square error) algorithm that minimizes the decision error by solving the following equation:

$$W(i+1)=W(i)+\mu \cdot r(i-D)e^*(i) \tag{1}$$

Specifically, a complex conjugate of the decision error $e^*(i)$ is scaled by a stepsize $\mu$ and the output signals of the antennas $1_1$ to $1_N$ are delayed in a delay unit 3 by delay time D, producing a vector of delayed signals r(i–D), and correlations W(i) are taken between the elements of the vector and the scaled decision error $\mu \cdot e^*(i)$, where D represents the total time taken to derive a decision error from a set of antenna signals and "i" represents a chip interval. Since the decision error is obtained at symbol intervals, the correlation values are integrated over the symbol time interval, producing a vector of weight coefficients W(i+1), which are applied respectively to the complex multipliers 21 as updated coefficients $W_1$ to $W_N$. The stepsize $\mu$ is determined so that the speed of convergence, the precision of convergence and the stability of the receiver are appropriately compromised. Optimum values of weight coefficients $W_1$ to $W_N$ are obtained in this way.

For a full understanding of the present invention, the operation of the CDMA receiver of this invention is mathematically analyzed as follows.

For a particular user "k", the output signal y(i) of the multiply-and-add circuit 2 during a chip interval "i" is given by:

$$y_k(i)=r(i)^T W_k^*(i) \tag{2}$$

where $r(i)^T$ is a transpose of the vector r(i) of the received signals.

Each of the despreaders $6_2$ to $6_M$ is implemented with a tapped-delay line filter (or transversal filter) which produces an output signal $z_{k,m}(j)$ for a transmitted symbol "j" by solving the following equation at symbol intervals:

$$z_{k,m}(j) = \frac{1}{L}\sum_{l=0}^{L-1} y_k(l+D_m)c_k(l) \tag{3}$$

where L is the length of the chip sequence $c_k$, and m=1, 2, . . . , M, and $D_m$ is the delay time of multipath component signal $S_m$ transmitted on the m-th propagation path with respect to the arrival time of the signal $S_1$ of the first propagation path. Equation (3) indicates that each despreader determines the correlation between the output signal $y_k(i)$ and the chip sequence $c_k$ and performs convolution integral of the correlation value over a symbol interval and divides the integral by the symbol interval represented by the integer L.

If the transmitted signal is a BPSK (bi-phase shift keying) signal and the channel response estimated for the symbol "j" on the multipath fading channel "m" by each demodulator $7_m$ (m=1, 2 . . . , M) is expressed as $\xi_{k,m}(j)$, then the output of the multiplier 73 of each demodulator $7_m$ produces an output signal $z_{k,m}(j)\xi^*_{k,m}(j)$. As a result, phase variation that occurs on each of the multipath fading channels (propagation paths) is compensated for by the multiplier 73 of each demodulator 7.

Decision circuit 9 performs a hard decision on the sum of the phase variation compensated signals and produces a decision output $\hat{d}_k(j)$ as follows:

$$\hat{d}_k(j) = Sgn\left[\sum_{m=1}^{M} z_{k,m}(j)\hat{\xi}^*_{k,m}(j)\right] \quad (4)$$

where Sgn (x) is a signum function which is 1 if x>0, 0 for x=0, −1 for x<0. The hard decision symbol output is multiplied in the multipliers $11_1$ to $11_M$ by the estimated channel responses $\hat{\xi}_{k,1}(j)$ to $\hat{\xi}_{k,M}(j)$, respectively, to produce output signals $\hat{d}_k(j)\hat{\xi}^*_{k,m}(j)$ from which the output signals $z_{k,m}(j)$ of the despreaders $6_1$ to $6_M$ are subtracted in the subtractors $12_1$ to $12_M$. The outputs of the subtractors 12 are multiplied with the chip sequence $c_k(i)$ in the complex multipliers 13 so that their output signals are given by:

$$E_{k,m}(i) = \{\hat{d}_k(j)\hat{\xi}^*_{k,m}(j) - z_{k,m}(j)\}c_k(i) \quad (4)$$

The purpose of the multiplication by the multipliers 11 of the error detector is to cancel the effects of the phase variation compensation by the multipliers 73 of the demodulators. Therefore, the phase variation components of the decision symbol are removed from the output signals $E_{k,m}(i)$ of the complex multipliers $13_1$ to $13_M$.

Alternatively, if the estimated value $|\hat{\xi}_{k,m}(j)|$ of each multipath fading channel is known in advance, the following equation can be used instead of Equation (4):

$$E_{k,m}(i) = \left\{\hat{d}_k(j)|\hat{\xi}^*_{k,m}(j)|\frac{\hat{\xi}^*_{k,m}(j)}{|\hat{\xi}^*_{k,m}(j)|} - z_{k,m}(j)\right\}c_k(i) \quad (5)$$

With the outputs of the multipliers 13 being time-aligned by the latch 14, the error detector 10 produces the following decision error:

$$e_k(i) = \sum_{m=1}^{M} E_{k,m}\{i - (D_M - D_m)\} \quad (6)$$

where DM represents the delay time of the signal $S_M$ of the M-th propagation path. As a result, the weight coefficients of the multiply-and-add circuit 2 are optimized uniquely to the multipath signal components of the user "k", so that the antenna gain of the array is strengthened in the arriving direction of the desired signal and weakened in the arriving directions of undesired signals. If the decision output is known in advance, a known symbol value can be used instead of the decision output $d_k(j)$.

It is seen that the present invention requires, for each user, only one multiply-and-add circuit and one weight control circuit. This contributes to significant hardware reduction. Additionally, since the combined decision error of the weight control circuit is derived from errors of the individual multipath components, the antenna array can be controlled with precision and high convergence speed even though numerous multipath components are contained in received signals.

Figure 2:
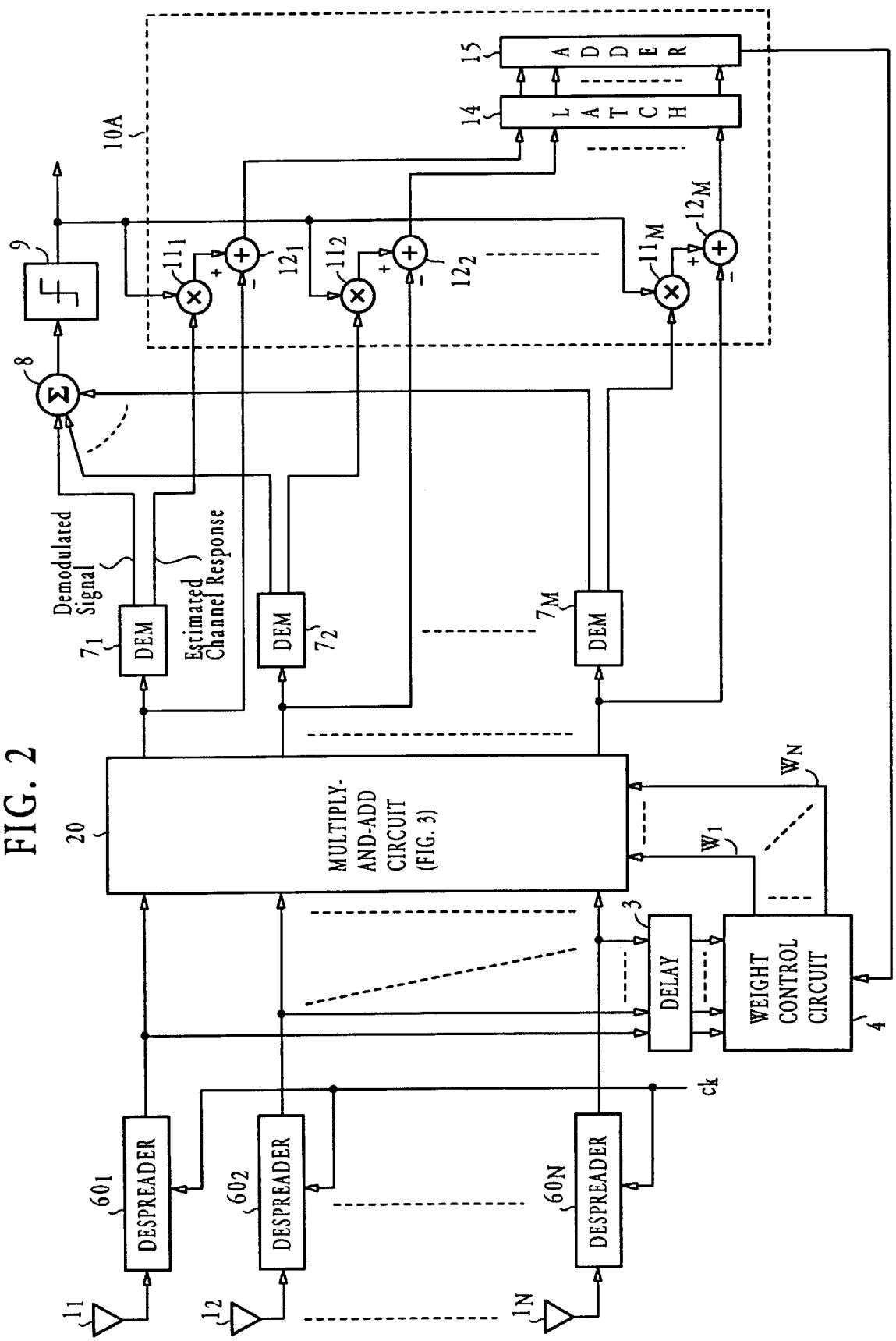
FIG. 2 is a block diagram of an adaptive array CDMA receiver according to a second embodiment of the present invention.

FIG. 2 is a block diagram of a modified embodiment of the present invention, in which parts corresponding in significance to those of FIG. 1 are marked with the same reference numerals as those used in FIG. 1. In FIG. 2, despreaders $60_1$ to $60_N$ are connected to the antennas $1_1$ to $1_N$, respectively. Each despreader is implemented with a tapped-delay line filter for calculating correlation between the signal from the corresponding antenna and the user's chip sequence $c_k$ at chip intervals, rather than at symbol intervals, so that correlations between multipath components of the signal is detected by the corresponding antenna and the chip sequence is determined by each despreader. These multipath components are delivered from each despreader in sequence to a corresponding input terminal of a multiply-and-add circuit 20. Delay circuit 3 is connected to the outputs of the despreaders $60_1$ to $60_M$. Weight control circuit 4 produces weight coefficients W1 to $W_N$ from the delayed outputs of the despreaders 60 and updates the coefficients according to the output of the error detection circuit 10A.

Figure 3:
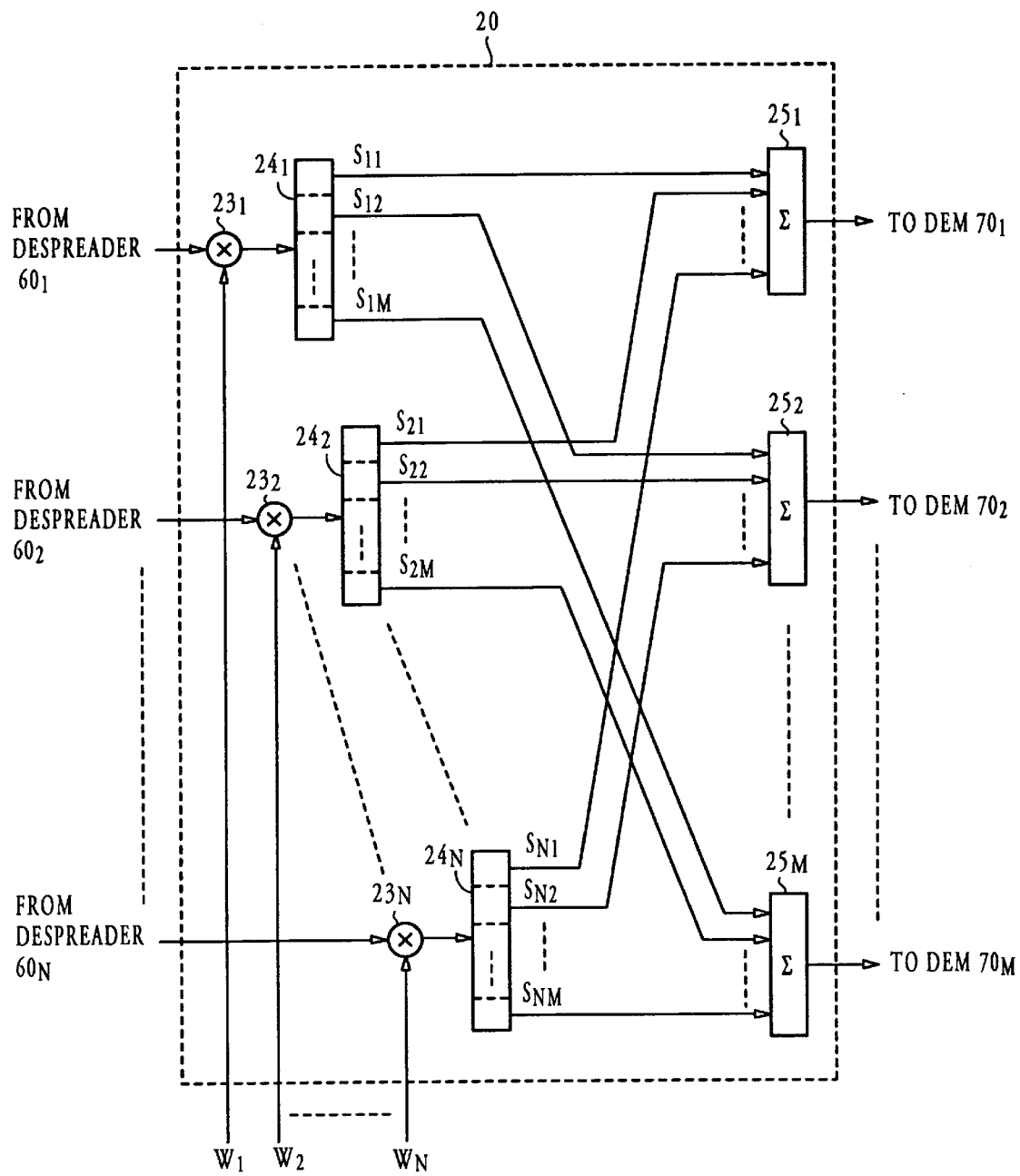
FIG. 3 is a block diagram of the multiply-and-add circuit of the second embodiment.

As shown in FIG. 3, the multiply-and-add circuit 20 includes multipliers $23_1$ to $23_N$ connected to the outputs of despreaders $60_1$ to $60_N$, respectively, for multiplying their outputs with weight coefficients $W_1$ to $W_N$. The outputs of multipliers $23_1$ to $23_N$ are sequentially delivered to separation circuits $24_1$ through $24_N$, respectively, where the multipath components of each of the weighted signals are separated and distributed to adders $25_1$ to $25_M$ so that the adder $25_1$ receives a set of earliest signals $S_{11}, S_{21}, \ldots, S_{N1}$ from the first outputs of the distribution circuits, the adder $25_2$ receives a set of second signals $S_{12}, S_{22}, \ldots, S_{N2}$ from the second outputs, and the adder $25_M$ receives a set of last signals $S_{1M}, S_{2M}, \ldots, S_{NM}$ from the M-th outputs of the distribution circuits.

Adders $25_1$ to $25_M$ combine their input signals to produce sum signals which are respectively supplied to demodulators $70_1$ to $70_M$.

The error detection circuit is indicated by numeral 10A. This circuit differs from the error detection circuit 10 of the previous embodiment by excluding the multipliers $13_1$ to $13_M$ and having the subtractors $12_1$ to $12_M$ subtract the outputs of the multiply-and-add circuit 20 from the outputs of multipliers $11_1$ to $11_M$, respectively, and utilizing the outputs of subtractors $12_1$ to $12_M$ as inputs of the latch 14.

Since the decision error of the error detection circuit 10A is detected without using the chip sequence, the adaptation of the array is performed at symbol intervals, which is advantageous for hardware reduction in comparison with the previous embodiment.

What is claimed is:

1. A code division multiple access communication receiver comprising:

a plurality of antennas spaced a correlation distance apart from each other;

multiply-and-add circuitry for respectively weighting signals from said antennas with weight coefficients and summing the weighted signals to produce a weighted sum signal;

separation circuitry for separating the weighted sum signal into multipath components which respectively correspond to propagation paths of a signal transmitted from a user station;

a plurality of despreaders for respectively despreading the separated multipath components with a chip sequence assigned to the user station to produce a plurality of despread signals at symbol intervals;

error detection circuitry for detecting a plurality of errors between a symbol output and the despread signals and combining said plurality of errors to produce a combined error signal; and weight control circuitry for producing said weight coefficients from the signals detected by said antennas and updating the weight coefficients according to the combined error signal.

2. A code division multiple access communication receiver as claimed in claim 1, further comprising:
   a plurality of demodulators for estimating channel responses of said propagation paths from the despread signals, and multiplying the despread signals by the estimated channel responses to produce a plurality of demodulated signals;
   an adder for summing said plurality of demodulated signals; and
   a decision circuit for making a threshold decision on the summed demodulated signals to produce a decision output as said symbol output,
   wherein said error detection circuitry is arranged to:
      multiply the decision output by the estimated channel responses to produce a plurality of multiplied decision outputs, and
      detect a plurality of differences between said plurality of multiplied decision outputs and the despread signals to produce said plurality of errors.

3. A code division multiple access communication receiver as claimed in claim 2, wherein said error detection circuitry is arranged to multiply said plurality of differences by the chip sequence.

4. A code division multiple access communication receiver as claimed in claim 1, wherein said error detection circuitry is arranged to multiply said plurality of errors by the chip sequence and combine the multiplied errors to produce said combined error signal.

5. A code division multiple access communication receiver as claimed in claim 1, wherein said symbol output is a known symbol value.

6. A code division multiple access communication receiver as claimed in claim 1, wherein said weight control circuitry is arranged to update said weight coefficients according to minimum mean square error algorithm.

7. A code division multiple access communication receiver comprising:
   a plurality of antennas spaced a correlation distance apart from each other;
   a plurality of despreaders for respectively despreading signals detected by the antennas with a chip sequence assigned to a user station to produce a plurality of despread signals at chip intervals;
   multiply-and-add circuitry for respectively weighting the despread signals by weight coefficients, separating each of the weighted despread signals into a plurality of multipath components which respectively correspond to propagation paths of a signal transmitted from the user station and summing the separated multipath components to produce a plurality of weighted sum signals each representative of the sum of the multipath components of same arrival tine;
   error detection circuitry for detecting a plurality of errors between a symbol output and said plurality of weighted sum signals, and combining said plurality of errors to produce a combined error signal; and
   weight control circuitry for producing said weight coefficients from said plurality of despread signals and updating the weight coefficients according to the combined error signal.

8. A code division multiple access communication receiver as claimed in claim 7, further comprising:
   a plurality of demodulators for estimating channel responses of said propagation paths from said weighted sum signals, and respectively multiplying the weighted sum signals by the estimated channel responses to produce a plurality of demodulated signals;
   an adder for summing said plurality of demodulated signals; and
   a decision circuit for making a threshold decision on the summed demodulated signals to produce a decision output as said symbol output,
   wherein said error detection circuitry is arranged to:
      multiply the decision output by the estimated channel responses to produce a plurality of multiplied decision outputs, and
      detect a plurality of differences between said plurality of multiplied decision outputs and the despread signals to produce said plurality of errors.

9. A code division multiple access communication receiver as claimed in claim 7, wherein said symbol output is a known symbol value.

10. A code division multiple access communication receiver as claimed in claim 7, wherein said weight control circuitry is arranged to:
    detect correlations between the despread signals from said despreaders and said combined error signal to produce correlation values;
    integrate the correlation values over a symbol interval to produce said weight coefficients.

11. A code division multiple access communication receiver as claimed in claim 7, wherein said weight control circuitry is arranged to update said weight coefficients according to minimum mean square error algorithm.

12. A method of processing a spread spectrum signal, comprising the steps of:
   a) receiving signals from a plurality of antennas spaced a correlation distance apart from each other, respectively weighting the received signals with weight coefficients and combining the weighted signals to produce a weighted sum signal;
   b) separating the weighted sum signal into multipath components which respectively correspond to propagation paths of a signal transmitted from a user station;
   c) respectively despreading the separated multipath components with a chip sequence assigned to the user station to produce a plurality of despread signals at symbol intervals;
   d) detecting a plurality of errors between a symbol output and the despread signals and combining said plurality of errors to produce a combined error signal; and
   e) detecting correlations between said received signals and the combined error signal to produce said weight coefficients.

13. A method as claimed in claim 12, further comprising the steps of:
   estimating channel responses of said propagation paths from the despread signals of the step (c);
   multiplying the despread signals by the estimated channel responses to produce a plurality of demodulated signals;
   summing said plurality of demodulated signals;
   making a threshold decision on the summed demodulated signals to produce a decision output as said symbol output, wherein the step (d) comprises the steps of:
      multiplying the decision output by the estimated channel responses to produce a plurality of multiplied decision outputs; and
      detecting a plurality of differences between said plurality of multiplied decision outputs and the despread signals to produce said plurality of errors.

14. A method of processing a spread spectrum signal, comprising the steps of:

a) receiving signals from a plurality of antennas spaced a correlation distance apart from each other, respectively despreading the received signals with a chip sequence assigned to a user station to produce a plurality of despread signals at chip intervals;

b) respectively weighting the despread signals by weight coefficients;

c) separating each of the weighted despread signals into a plurality of multipath components which respectively correspond to propagation paths of a signal transmitted from the user station;

d) summing the separated multipath components to produce a plurality of weighted sum signals each representative of the sum of the multipath components of same arrival time;

e) detecting a plurality of errors between a symbol output and said plurality of weighted sum signals and combining said plurality of errors to produce a combined error signal; and f) detecting correlations between said plurality of despread signals and said combined error signal to produce said weight coefficients.

15. A method as claimed in claim 14, further comprising the steps of:

estimating channel responses of said propagation paths from said weighted sum signals of the step (d);

respectively multiplying the weighted sum signals by the estimated channel responses to produce a plurality of demodulated signals;

summing said plurality of demodulated signals; and making a threshold decision on the summed demodulated signals to produce a decision output as said symbol output, wherein the step (e) comprises the steps of:

multiplying the decision output by the estimated channel responses to produce a plurality of multiplied decision outputs; and detecting a plurality of differences between said plurality of multiplied decision outputs and the despread signals to produce said plurality of errors.

* * * * *